US007124363B2

(12) United States Patent  
Aono et al.

(10) Patent No.: US 7,124,363 B2
(45) Date of Patent: Oct. 17, 2006

(54) SYSTEM AND METHOD FOR DISCLOSING DESIGN INFORMATION (75) Inventors: Toshikazu Aono, Tendo (JP); Yukio Kobayashi, Tendo (JP); Takashi Emori, Tendo (JP); Kazuyuki Kinai, Tendo (JP)

(73) Assignees: Pioneer Corporation, Tokyo-To (JP); Tohoku Pioneer Corporation, Yamagata-Ken (JP)

( * ) Notice: Subject to any disclaimer, the term of this patent is extended or adjusted under 35 U.S.C. 154(b) by 597 days.

(21) Appl. No.: 10/155,962

(22) Filed: May 29, 2002

(65) Prior Publication Data  
US 2002/0184271 A1 Dec. 5, 2002

(30) Foreign Application Priority Data  
Jun. 1, 2001 (JP) ............................ P2001-167260

(51) Int. Cl.  
G06F 15/00 (2006.01)

(52) U.S. Cl. .................... 715/531; 345/467; 709/224

(58) Field of Classification Search ............... 715/531, 715/511, 512, 513, 516, 530  
See application file for complete search history.

(56) References Cited  
U.S. PATENT DOCUMENTS

| 5,315,504 A * | 5/1994 | Lemble ................... 700/90 |
| 5,513,323 A * | 4/1996 | Williams et al. ............ 709/246 |
| 5,625,827 A * | 4/1997 | Krause et al. .............. 715/502 |
| 5,694,580 A | 12/1997 | Narita et al. |
| 5,963,966 A | 10/1999 | Mitchell et al. |
| 6,064,977 A * | 5/2000 | Haverstock et al. ........... 705/9 |
| 6,070,167 A * | 5/2000 | Qian et al. .................. 707/102 |
| 6,327,611 B1 * | 12/2001 | Everingham ................ 709/206 |
| 6,396,598 B1 * | 5/2002 | Kashiwagi et al. ......... 358/474 |
| 6,484,156 B1 * | 11/2002 | Gupta et al. ................. 707/1 |
| 6,584,466 B1 * | 6/2003 | Serbinis et al. ............. 707/10 |
| 6,792,572 B1 * | 9/2004 | Frohlick .................... 715/500 |

(Continued)

FOREIGN PATENT DOCUMENTS

EP 0 869 652 A2 10/1998

(Continued)

OTHER PUBLICATIONS

Roposh et al. "Developing Single-Source Documentation for Multiple Formats", Proceedings of he 14th Annual International Conference on Systems Documentation, published by ACM Press 1996, pp. 205-212.*

*Primary Examiner*—William Bashore  
*Assistant Examiner*—Quoc A. Tran  
(74) *Attorney, Agent, or Firm*—Nixon & Vanderhye, PC (57) ABSTRACT An example design information disclosure system includes a design information managing system for storing design information produced on the basis of a given format, a terminal system, connected to a communication network, having a terminal with an electronic mail function, and a design information disclosing system connected to the communication network. The disclosing system has a format converter and a storage to establish a TIFF file. The format converter receives design information at a predetermined timing when the design information is made to be stored into the design information storing system and converts the received design information into a format displayable on the terminal. The TIFF file is used to store the format-converted design information as terminal-use design information. The terminal system is configured to display on the terminal the terminal-use design information through the electronic mail function.

13 Claims, 10 Drawing Sheets

U.S. PATENT DOCUMENTS

| | | | |
|---|---|---|---|
| 6,873,971 B1 * | 3/2005 | Tackbary et al. | 705/27 |
| 2002/0019751 A1 * | 2/2002 | Rothschild et al. | 705/3 |
| 2002/0171669 A1 * | 11/2002 | Meron et al. | 345/619 |
| 2005/0005240 A1 * | 1/2005 | Reynar et al. | 715/533 |

FOREIGN PATENT DOCUMENTS

| | | |
|---|---|---|
| JP | 09 128284 A | 5/1997 |
| WO | WO 00/20985 | 4/2000 |

* cited by examiner

FIG. 9 though the invention is not limited to specific embodiments disclosed; not intended.

SYSTEM AND METHOD FOR DISCLOSING DESIGN INFORMATION

BACKGROUND OF THE INVENTION

1. Technical Field

The present invention relates to a system and a method for disclosing design information, such as design drawings and parts lists, as mail information via a communication network, and a recording medium in which a program that allows both the system and the method to disclose the design information is stored.

2. Related Art

A conventional document management system employs various management ways involving manual labor. For instance, documents on which seals have manually been put are subject by hand to optical reading with an image scanner. Alternatively, documents are electronic-processed and preserved in a document management system, from which a desired electronic-processed document is outputted for its transfer in response to a manual command.

However, as described above, many steps to perform both work and management are necessary in the conventional document management system that requires manual labor for electronic-processing of documents. In addition, such an intervening manual operation tends to cause some mistakes in the management, such as a forgotten transfer operation. Further, because documents are disclosed by hand from the document management system, a different document may disclosed by mistake or the disclosure of documents are unstable in disclosure timing.

SUMMARY OF THE INVENTION

The present invention has been made with due consideration to the foregoing drawbacks, and an object of the present invention is to provide a system and a method for disclosing information about design in a steady and quick manner, with the steps necessary for both work and management of document management still reduced.

In order to accomplish the foregoing object, as one aspect, the present invention provides a design information disclosure system comprising: a design information storing unit configure to store design information produced on the basis of a given format; a terminal system, connected to a communication network, having a terminal with an electronic mail function; and a design information disclosing unit, connected to the communication network, including a format converting unit for receiving design information at a predetermined timing when the design information is made to be stored into the design information storing unit and converting the received design information into a format displayable on the terminal, and a terminal-use design information storing unit for storing the format-converted design information as terminal-use design information, wherein the terminal system is configured to display on the terminal the terminal-use design information storing unit through the electronic mail function.

Hence, this configuration makes it possible to disclose design information in an automatic fashion. Work man-hours and management man-hours necessary for management of documents can be lowered markedly, while the design information can be disclosed in a steady and quick manner.

In addition, the format converting unit, which is able to convert various-format data into data on the same format, is arranged, so that the same type of interface arranged to view design information on the users' side can be used. Accordingly, it is possible to use the design information in common, which leads to various advantages, such as an earlier start of work at the next process, an earlier finding of contents of problems, and elimination of repeated redundant work.

As a second aspect, the present invention provides a design information disclosure system comprising: a design information storing unit configured to store design information produced on the basis of a given format; a terminal system, connected to a communication network, having a terminal with an electronic mail function; a design information disclosing unit, connected to the communication network, including a format converting unit for receiving design information at a predetermined timing when the design information is made to be stored into the design information storing unit and converting the received design information into a format displayable on the terminal, a terminal-use design information storing unit for storing the format-converted design information as terminal-use design information, and a mail address storing unit for storing a mail address of the terminal in order to transmit to the terminal either of the design information or the terminal-use design information; and a unit for transmitting a certain piece of terminal-use design information in association with a certain piece of design information received with reference to the mail address stored in the mail address storing unit, to a certain terminal having a certain mail address to which a mail is distributed, in cases where the format converting unit receives the design information at the predetermined timing for the format conversion.

In this configuration, terminal-use design information in accordance with design information received with reference to the mail addresses is transmitted to a certain personal computer in the terminal system, the personal computer having a certain mail address to which mail delivery should be done. Thus, a user who handles the personal computer is able to acquire design information with steadiness.

As a third aspect, the present invention provides a design information disclosure system comprising: a design information storing unit configure to store design information produced on the basis of a given format; a terminal system, connected to a communication network, having a terminal with an electronic mail function; and a design information disclosing unit, connected to the communication network, including a search information storing unit for storing search information to search the design information stored in the design information storing unit, a format converting unit for receiving design information at a predetermined timing when the design information is made to be stored into the design information storing unit and converting the received design information into a format displayable on the terminal, and a terminal-use design information storing unit for storing the format-converted design information as terminal-use design information; and a unit configure to read and display, in cases where the search information is displayed on the terminal and a certain piece of design information is specified on the terminal, a certain piece of terminal-use design information corresponding to the specified search information stored in the terminal-use design information storing unit.

In this configuration, the search information is displayed by each personal computer in the terminal system, and in response to specification of a desired piece of search information on a certain personal computer, pieces of terminal-use design information that correspond to the specification are read out and displayed. This enables design information desired by a user to be provided securely.

In the above various configurations, it is preferred that the predetermined timing is decided as a time when storing the design information into the design information storing unit has been approved. This assures the establishment of stable disclosure timing, in addition to a secure disclosure of the design information.

It is also preferred that the design information disclosing unit has a design information storing file to store the design information that has been received, the design information stored in the design information storing file being read and format-converted by the format converting unit.

In addition, preferably, the format converting unit is configured to convert hand-written design information read by an information reading unit to the format displayable on the terminal.

As a fourth aspect of the present invention, there is provided a method of disclosing design information comprising the steps of: storing design information produced in a predetermined format; receiving the design information at a predetermined timing; converting the design information into a format displayable by a terminal having an electronic mail function; storing the format-converted design information as terminal-use design information; and reading the terminal-use design information using an electronic mail so that the terminal-use design information is displayable on the terminal.

Like the foregoing first aspect of the present invention, work man-hours and management man-hours necessary for management of documents can be lowered markedly, while the design information can be disclosed in a steady and quick manner. In addition, it is possible to use the design information in common, which leads to various advantages, such as an earlier start of work at the next process, an earlier finding of contents of problems, and elimination of repeated redundant work.

As a fifth aspect, the present invention provides a method of disclosing design information comprising the steps of: storing design information produced in a predetermined format; receiving the design information at a predetermined timing; converting the design information into a format displayable by a terminal having an electronic mail function; storing the format-converted design information as terminal-use design information; storing a mail address of the terminal in order to transmit to the terminal either the design information or the terminal-use design information; and transmitting a certain piece of terminal-use design information in association with a certain piece of design information received with reference to a certain mail address, to a certain terminal having the mail address to which a mail is distributed, in cases where the design information is converted in format.

Like the foregoing second aspect of the present invention, a user who handles the personal computer is able to acquire design information with steadiness.

Still, as a sixth aspect, the present invention provides a method of disclosing design information comprising the steps of: storing design information produced in a predetermined format; receiving the design information at a predetermined timing; converting the design information into a format displayable by a terminal having an electronic mail function; storing the format-converted design information as terminal-use design information; storing search information to search the design information; and reading and displaying, in cases where the search information is displayed on the terminal and a certain piece of design information is specified on the terminal, a certain piece of terminal-use design information corresponding to the specified search information.

Like the foregoing third aspect of the present invention, this enables design information desired by a user to be provided securely.

In the fourth to sixth aspects, it is preferred that the predetermined timing is decided as a time when storing the design information into a storing unit has been approved.

Still, a further aspect of the present invention provides a computer-readable recording medium in which a program for realizing the functions performed in the design information disclosure system and method.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENT

Referring to the accompanying drawings, a preferred embodiment of the present invention will now be described.

First, a design information disclosure system according to the present invention will be outlined. This system is provided with a design information managing system and an interface incorporated in the design information managing system, in which both of a document database and a drawing database are managed in association with each other. In response to a trigger of "electronic approval of a document," a search key file that relates part numbers to documents, a PS (Post Script) of document (parts specification) data, and an HPGL (Hewlett-Packard Graphic Language) of drawing data are extracted automatically through the interface, respectively. The extracted files of which formats are different from each other are converted into image data in agreement with a TIFF (Tag Image File Format) file by "format converting means." The converted image data are automatically registered via an interface into a database operating on Notes (registered trademark), groupware made by Lotus Development Corp. in US.

Figure 1:
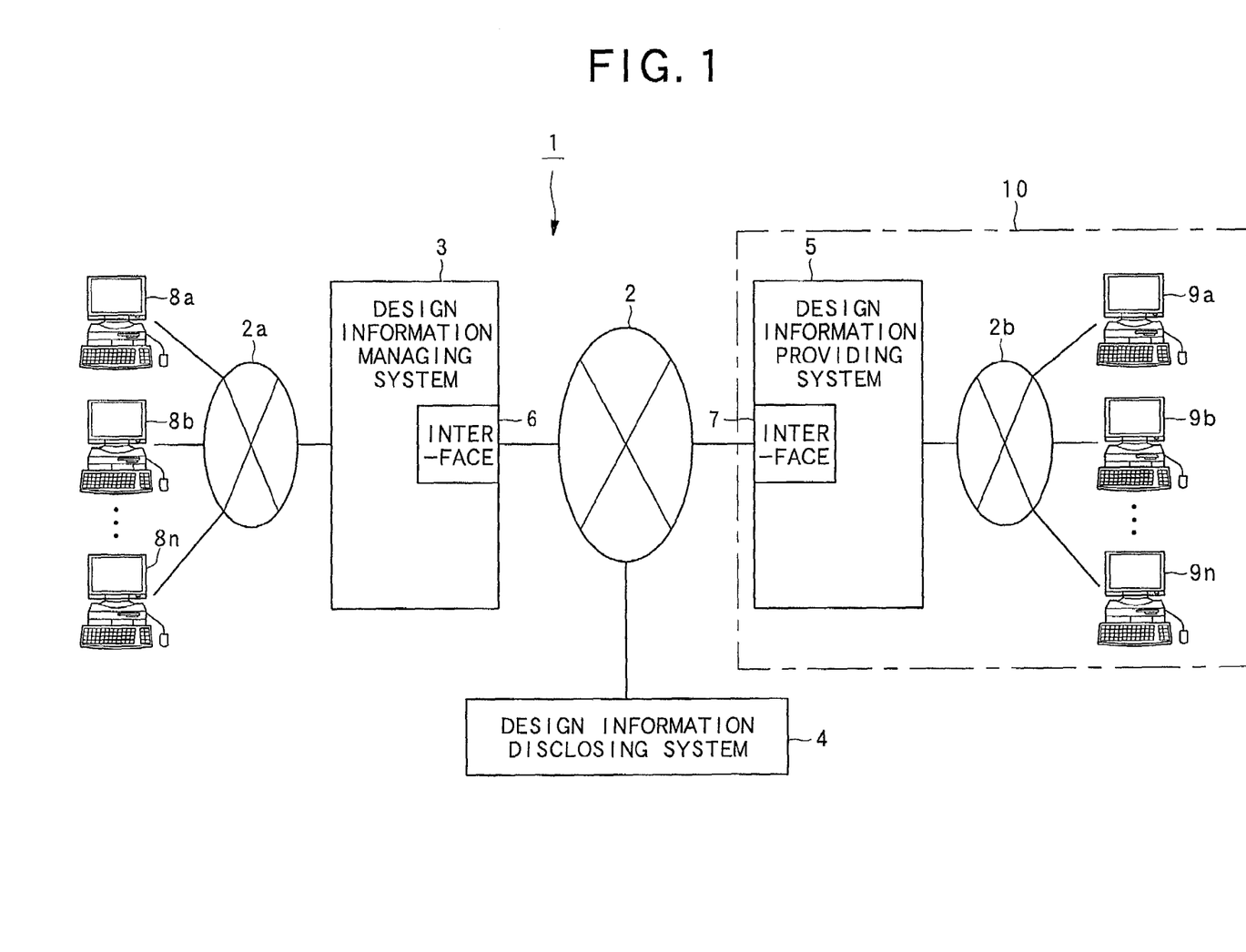
FIG. 1 is a schematic view outlining one embodiment of a design information disclosure system according to the present invention.

FIG. 1 is an outlined schematic view showing one embodiment of a design information disclosure system 1 according to the present invention.

As shown in FIG. 1, the design information disclosure system 1 includes a design information managing system 3, a design information disclosing system 4 serving as a design disclosing unit of the present invention, and a design information providing system 5. These constituents are mutually connected to each other by way of an intranet 2 functioning as a communication network. The design information managing system 3 is connected with the intranet 2 via an interface 6 placed in the systems 3. Similarly, the design information providing system 5 is connected with the intranet 2 via an interface 7 operating on Notes ®.

The design information managing system 3 is linked with general-purpose personal computers 8a, 8b, . . . , 8n by way of another intranet 2a, whilst the design information providing system 5 is also connected with general-purpose personal computers 9a, 9b, . . . , 9n by way of another intranet 2b. The design information providing system 5, interface 7, and each of the personal computers 9a, 9b, . . . , 9n compose a terminal system 10. Each of the general-purpose personal computers 9a, 9b, . . . , 9n has an electric mail function.

Figure 2:
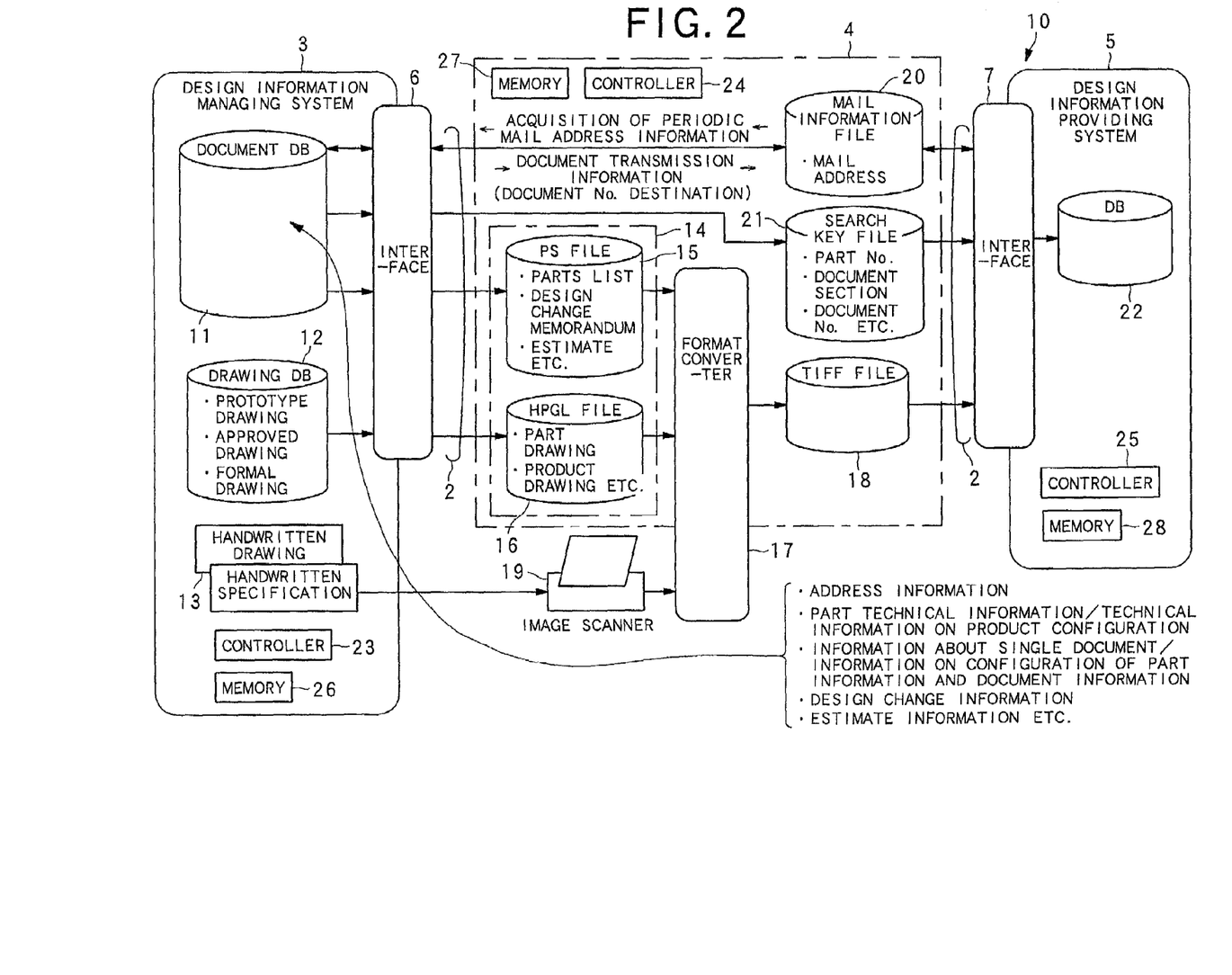
FIG. 2 is a schematic view showing the hardware configuration of the design information disclosing system.

FIG. 2 is a schematic view showing the hardware configuration of the design information disclosing system shown in FIG. 1. In FIG. 2, the personal computers 8a, 8b, . . . , 8n and 9a, 9b, . . . , 9n are omitted from being depicted.

As shown in FIG. 2, the design information managing system 3 has a document database (DB) 11 and a drawing database (DB) 12 in order to manage both document data and drawing data in a mutually associated manner, so that the personal computer 8a, 8b, . . . , 8n shown in FIG. 1 are used for managing the preservation of design information composed of both the document data and the drawing data. Both the document database 11 and the drawing database 12 serve as design information storing unit of the present invention.

The document database 11 stores, in addition to information about addresses, part technical information about each single part; configuration technical information about a product and document information about each set of a technical document, which are formed by combined pieces of combined technical information; data including information about configurations of part information and document information, information about design changes, and information about estimations.

The drawing database 12 stores data of prototype drawings, approved drawings, and formal drawings made by CADs and/or CAMs (CADAMs). Both of handwritten drawings and handwritten specifications 13, which compose handwritten design information, are also stored in the dawning database 12 in states where they are written on sheets of paper.

The interface 6 placed in the design information managing system 3 is in charge of not only transmission and reception of mail address information but also extraction of search keys that connect product numbers (part Nos.) to documents. Additionally, the interface 6 operates so as to automatically extract document data of PS (Post Script) files and drawing data of HPGL files from the databases 11 and 12, respectively.

Further, the design information managing system 3 has a controller 23 that controls the actions of all the constituents installed in this system 3. A memory device 26, in which a program required by the controller 23 is readably stored, is also arranged in this system 3.

The design information disclosing system 4 receives design information at a predetermined timing in cases where both document data and drawing data, that is, design information, are stored in the system 4 for disclosure of the design information. The design information disclosing system 4 includes storage units in which a design information storing file 14 is realized which temporarily stores the received design information for buffering. This design information storing file 14 includes a PS file 15 and an HPGL file 16 preserved in the storage units, which are extracted via the interface 6. Into the PS file 15, document data, such as parts lists, design change memorandums, and estimates, are stored, which into the HPGL file 16, drawing data, such as part drawings and product drawings, are store.

The document data stored in the PS file 15 and the drawing data stored in the HPGL file 16 are converted into a given format of data displayable in the terminal system 10 by a format converter 17 functioning as a format converting unit of the present invention. The converted data are thus stored as a TIFF file 18 established in a storage unit, which serves the terminal-use design information storing unit.

The predetermined timing is defined as a time when storing the design information into the TIFF file 18 is approved through electric manners, such as electric authentication.

An image scanner 19 that serves as an information reading unit of the present invention reads the handwritten drawings and handwritten specifications 13. The read data are then converted by the format converter 17 into a format displayable in the terminal system 10, then the converted electric data are stored into the TIFF file 18.

The design information disclosing system 4 includes a storage unit that establishes a mail information file 20 operating as a mail address storing unit of the present invention, in which mail addresses to transmit either the design information or the terminal-use design information to the terminal system 10. The mail information file 20 contributes to a distribution management function that is responsible for obtaining information in relation to document transmission, such as document numbers and destinations, from the interface 6 of the design information managing system 3. By contrast, the interface 6 acquires mail address information at intervals from the mail information file 20.

Further, the design information disclosing system 4 has a controller 24 that controls the actions of all the constituents installed in this system 4. The controller 24 also performs control on all access to the files 15, 16, 18, 20 and 21 as well as transmission of the files 18, 20 and 21 to the interface 7 of the design information providing system 5. A memory device 27, in which a program required by the controller 24 is readably stored, is also arranged in this system 4.

Hence, when receiving design information at predetermined timing and then converting its format, the design information disclosing system 4 makes reference to the mail addresses in the mail information file 20 to determine a certain mail address. Then the design information disclosing system 4 transmits terminal-use design information according to the received design information to any of the personal computers 9a, 9b, ..., 9n, of which mail address has been determined.

Further, the design information disclosing system 4 includes a storage unit responsible for preservation of a search key file 21. This file 21 is designed such that it stores search information, such as product numbers (part Nos.), document classification, and document numbers, used for searching design information managed by the design information managing system 3. Information that has been searched is displayed on any of the personal computers 9a, 9b, ..., 9n in the terminal system 10. In the case that a piece of desired searched information is specified at one to the personal computers 9a, 9b, ..., 9n, the terminal-use design information is read from the TIFF file 18 for display.

The design information providing system 5 arranged in the terminal system 10 has a database 22 operating on Notes®, into which not only the terminal-use design information in the TIFF file 18 is stored but also the search information in the search key file 21 is stored. In the database 22, distributed divisions and mail addresses for those pieces of information are recorded.

The interface 7 of the design information providing system 5 automatically transmits mails and produces a Notes® file based on the search keys in the search key file 21. The interface 7 pastes data of a certain TIFF file 18 onto the Notes® file in the database 22.

Further, the design information providing system 5 has a controller 25 that controls the actions of all the constituents installed in this system 5. The controller 24 also performs control on access to the database 22 as well as reception of the files 18, 20 and 21 to the interface 7. A memory device 28, in which a program required by the controller 25 is readably stored, is also arranged in this system 5.

Figure 3:
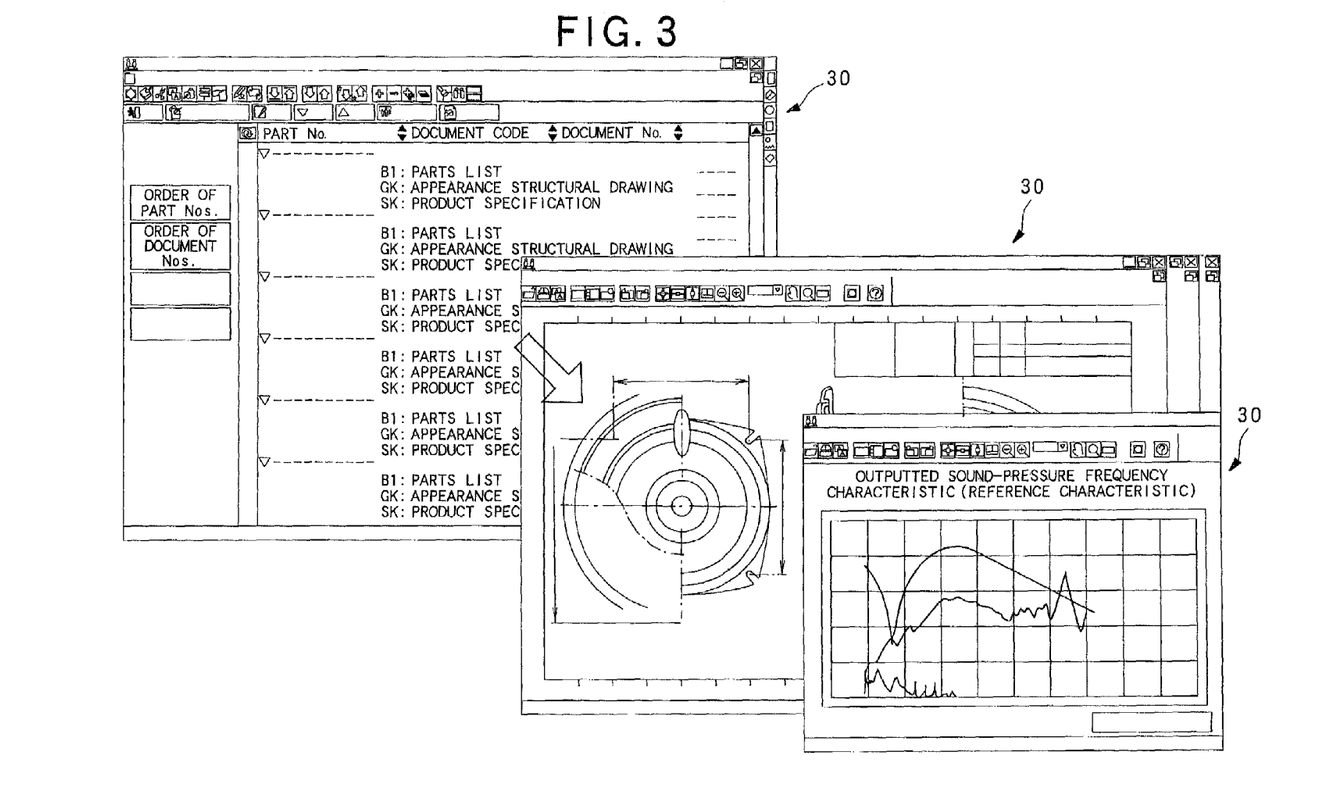
FIG. 3 exemplifies a screen image displayed on the monitor of a personal computer employed by the design information disclosing system.

Each of the personal computers 9a, 9b, ..., 9n belonging to the terminal system 10 is able to read search information from the database 22, in response to the activation of the design information providing system 5, so that search keys are displayed on the monitor of each personal computer, as shown in FIG. 3. Responsively to specification of a desired document on the displayed monitor screen, pieces of design information corresponding to the specification is read from the TIFF file 18 stored in the database 22, and displayed on the monitor through activation of a viewer installed therein.

The operation in the present embodiment will now be explained.

Whenever design information is newly produced by the personal computers 8a, 8b, ..., 8n, the design information is sent to the design information managing system 3 so that it is subject to storage therein. Concurrently with this storage, the new design information is also sent to both the PS file 15 and the HPGL file 16 of the design information disclosing system 4 at a time when it is has been approved. The sent design information is temporarily stored in both the PS file 15 and the HPGL file 16 serving as buffers.

Document data stored in the PS file 15 and drawing data stored in the HPGL file 16 are converted by the format converter into data whose formats are displayable in the terminal system 10, and stored into the TIFF file 18.

On the other hand, the mail information file 20 receives and stores therein mail addresses every time design information is produced. The mail addresses stored every time the design information is produced are composed of, for example, a mail address of a design section and a further mail address of a manufacturing technical section, to which documents of design changes are forwarded. By way of example, each of the mail addresses is determined by employing all figures or superior several figures of a document code or document number. Design information can be read from the TIFF file 18 with the mail addresses accompanied to the design information. Every time design information is newly produced, the mail addresses are referred to so that format-converted design information is obliged to be transmitted to one or more personal computer 9a, 9b, ..., 9n having specified mail addresses in the terminal system 10.

In the search key file 21, search keys including part numbers, document codes, and document numbers are stored. In response to both activating the design information providing system 5 in the terminal system 10 and driving the design information disclosing system 4, the information in the search key file 21 is read out to display the search keys. Sorting with a specified type of key allows display modes of the search keys to be changed. Alternatively, it may also be possible that a desired search key is directly specified by inputting characters through each of the personal computers 9a, 9b, ..., 9n in the terminal system 10.

When a document to be desired is specified on a screen displayed as shown in FIG. 3 by each of the personal computers 9a, 9b, ..., 9n, design information that corresponds to the specification is read out from the TIFF-formatted data stored in the database 22, and the viewer enables the read-out design information to be displayed in turn on the screen in a development manner.

Figure 4:
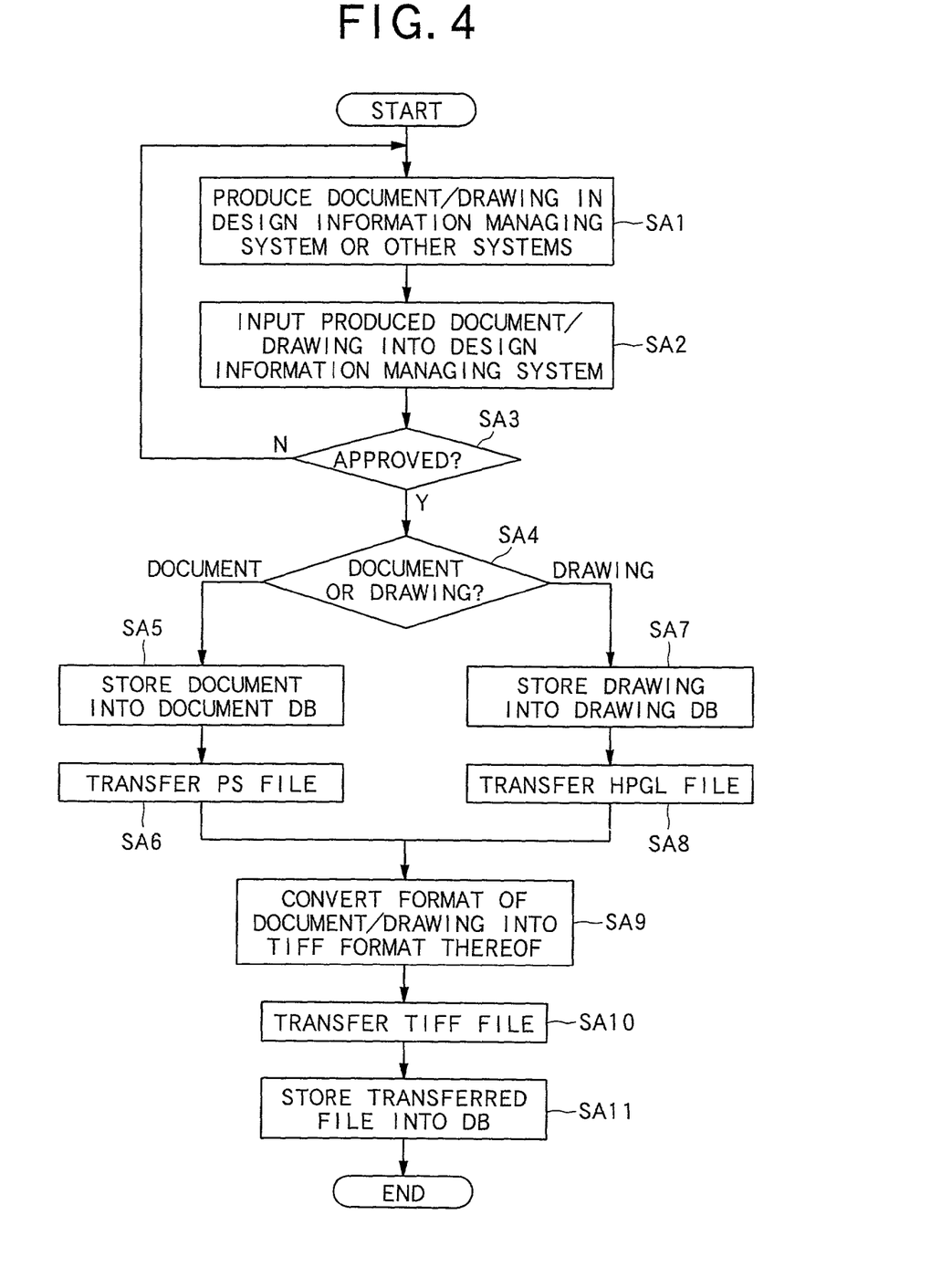
FIG. 4 is a flowchart showing format-conversion processing carried out in the embodiment.

Referring to FIG. 4, the processing for format conversion will now be described.

Documents and/or drawings are produced in a given format using the design information managing system 3, or one or one personal computers 8a, 8b, ..., 8n, which serve other systems, and the produced document/drawing information is provided to the design information managing system 3 (steps SA1 and SA2).

At step SA3, it is then determined whether or not to store the design information into the TIFF file 18 has been approved. If approved, the processing proceeds to step SA4, but if not approved yet, the processing returns to step SA1. At step SA4, it is further determined if the design information concerns data of a document or a drawing. If the design information is made of data concerning the document, the processing proceeds to step SA5, in which the data are stored in the document database 11, then the data concerning the document are transferred to the format transformer 17 (step SA6).

On the other hand, if the determined result at step SA4 reveals that the design information is made of data concerning the drawing, the processing goes to step SA7, where the data are stored in the drawing database 12. Then drawing data in the HPGL file 16 are transmitted to the HPGL file 16 (step SA8).

Both of the document data on the PS format transferred at step SA6 and the drawing data on the HPGL format transferred at step SA8 are then subjected to format conversion into the TIFF format displayable in the terminal system 10 by the format converter 17 (step SA9). The format-converted data are stored in the TIFF file 18.

After both the document data and the drawing data on the TIFF format are transferred to the interface 7 (step SA10), both document data and drawing data on the TIFF format, which are terminal-use design information, are stored in the database 22 operating on Notes® (step SA11), before the processing ends. The data on Notes® are allowed to be read and displayed in the terminal system 10 through the electric mail function.

Figure 5:
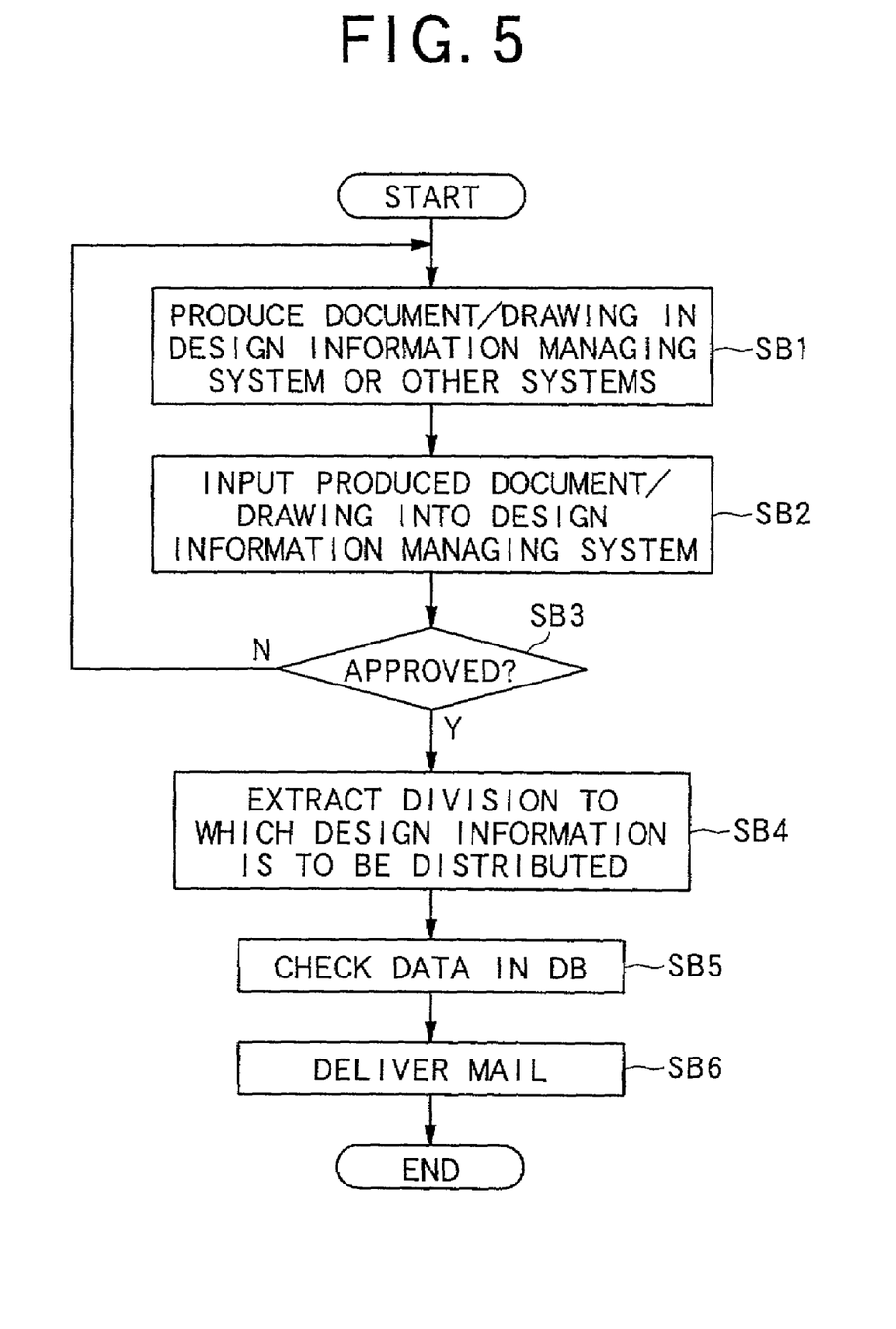
FIG. 5 is a flowchart showing processing for producing mail addresses of destinations.

Referring to FIG. 5, the processing for producing mail addresses to which a mail is distributed. The processing after step SB3 in the flowchart shown in FIG. 5 is carried out in parallel to the processing at steps SA4 to SA11 in the format conversion processing shown in FIG. 4.

Like those of the format conversion processing shown in FIG. 4, at steps SB1 to SB3, documents and/or drawings are produced in a given format using the design information managing system 3, or one or more personal computers 8a, 8b, . . . , 8n, which serve other systems, and the produced document/drawing information is provided to the design information managing system 3 (steps SB1 and SB2).

At step SB3, it is then determined whether or not to store the design information into the TIFF file 18 has been approved. If approved, the processing proceeds to step SB4, but if not approved yet, the processing returns to step SB1. At step SB4, a division to which the design information is to be distributed is extracted, and at step SB5, the extracted division is made reference to the database 22 on Notes®.

In the database 22, divisions to which mail distribution are expected and their mail addresses are previously registered. Thus, a checking process is carried out in the database 22 with use of the data of the design information, which has been transferred for each document and distributed from the design information managing system 3, one or more distributing division codes being attached to the design information.

Then, at step SB6, a mail with the design information is delivered to the destination of a checked division. In other words, when the design information has undergone its format conversion, terminal-use design information in accordance with the design information received with a mail address is transmitted to any of the personal computers 9a, 9b, . . . , 9n in the terminal system 10, the mail address being assigned to the certain personal computer.

Figure 6:
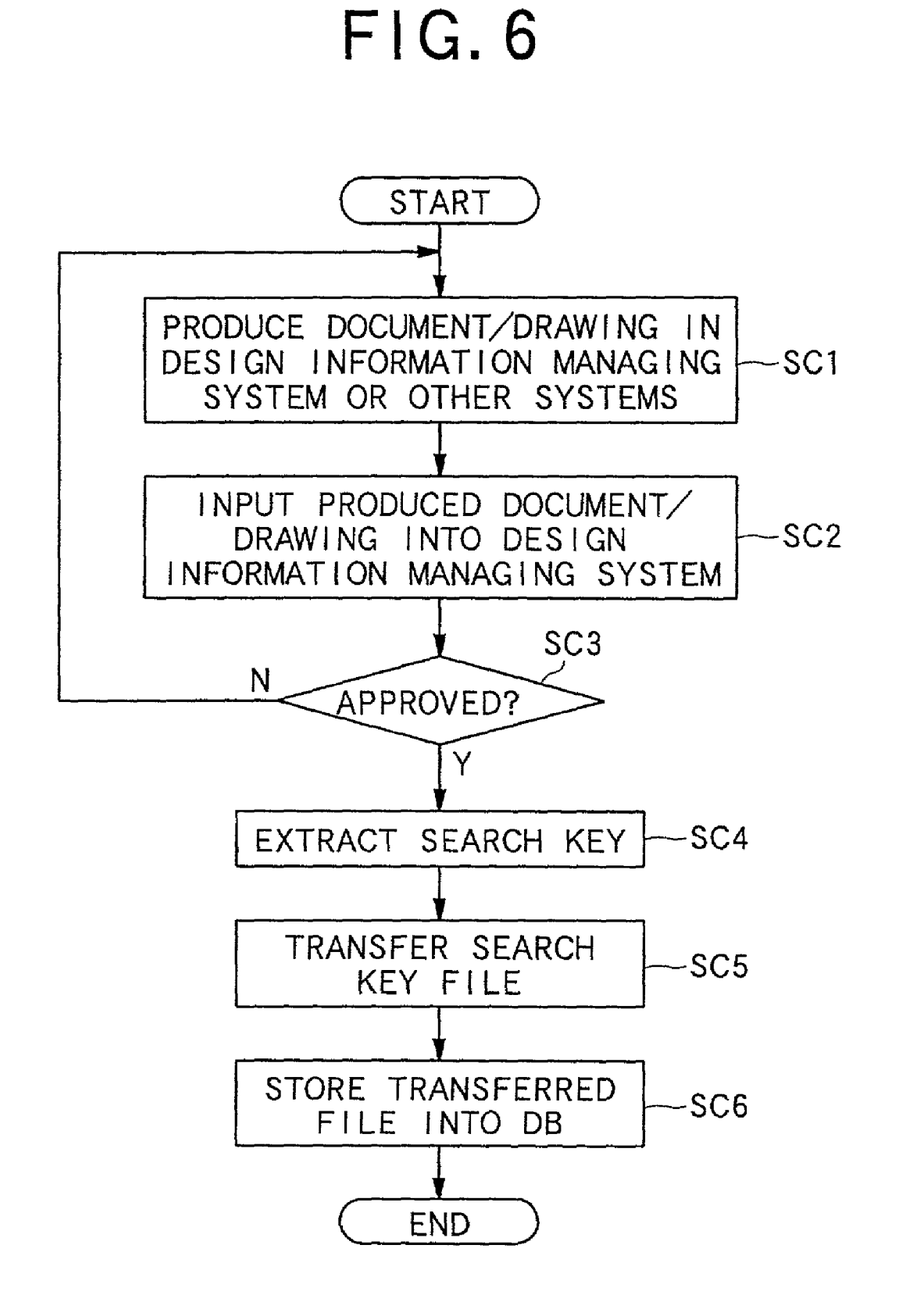
FIG. 6 is a flowchart showing processing for producing search keys according to the present invention.

Furthermore, referring to FIG. 6, the processing for producing search keys will now be explained. The processing after step SC3 in the flowchart shown in FIG. 6 is carried out in parallel to the processing at steps SA4 to SA11 in the format conversion processing shown in FIG. 4.

Like those of the format conversion processing shown in FIG. 4, at steps SC1 to SC3, documents and/or drawings are produced in a given format using the design information managing system 3, or one or more personal computers 8a, 8b, . . . , 8n, which serve other systems, and the produced document/drawing information is provided to the design information managing system 3 (steps SC1 and SC2).

At step SC3, it is then determined whether or not to store the design information into the TIFF file 18 has been approved. If approved, the processing proceeds to step SC4, but if not approved yet, the processing returns to step SC1. At step SC4, a search key is extracted to record in the search key file 21. The search key represents information about a single technical document produced by the design information managing system 3.

Then, at step SC5, the search information stored in the search key file 21 is transferred toward database 22 via the interface 7, and at step SC6, the transferred search information is stored in the database 22, before ending the processing. This enables the personal computers 9a, 9b, . . . , 9n in the terminal system 10 to display the search information on the monitor screen of each personal computer. When a desired piece of the displayed search information is specified, terminal-use design information corresponding to the specified search information is read out from the database 22, with the terminal-use design information displayed on the monitor.

Figure 7:
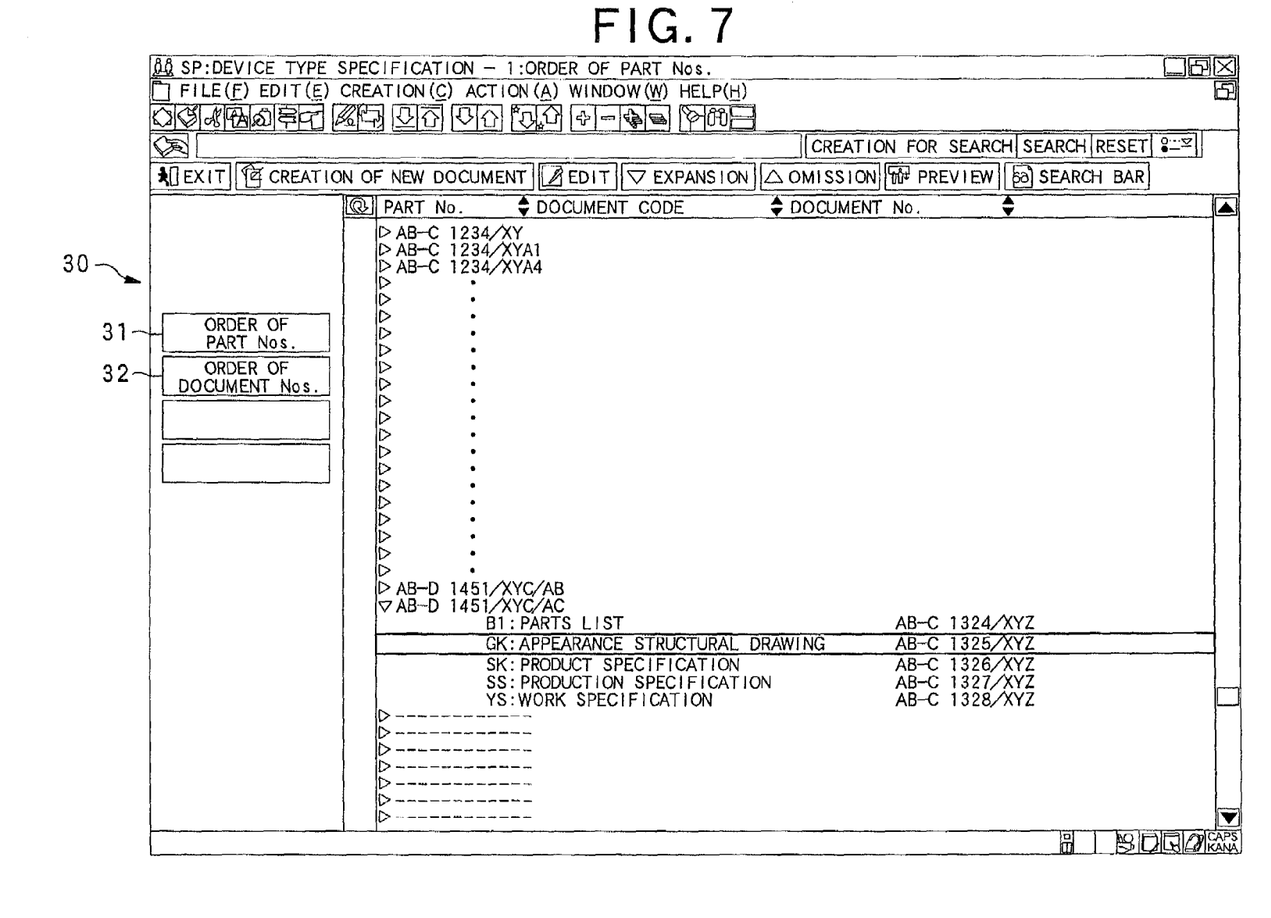
FIG. 7 illustrates an example of a screen image on which pieces of design information are displayed in sequence based on part numbers using the search keys in the present embodiment.
Figure 8:
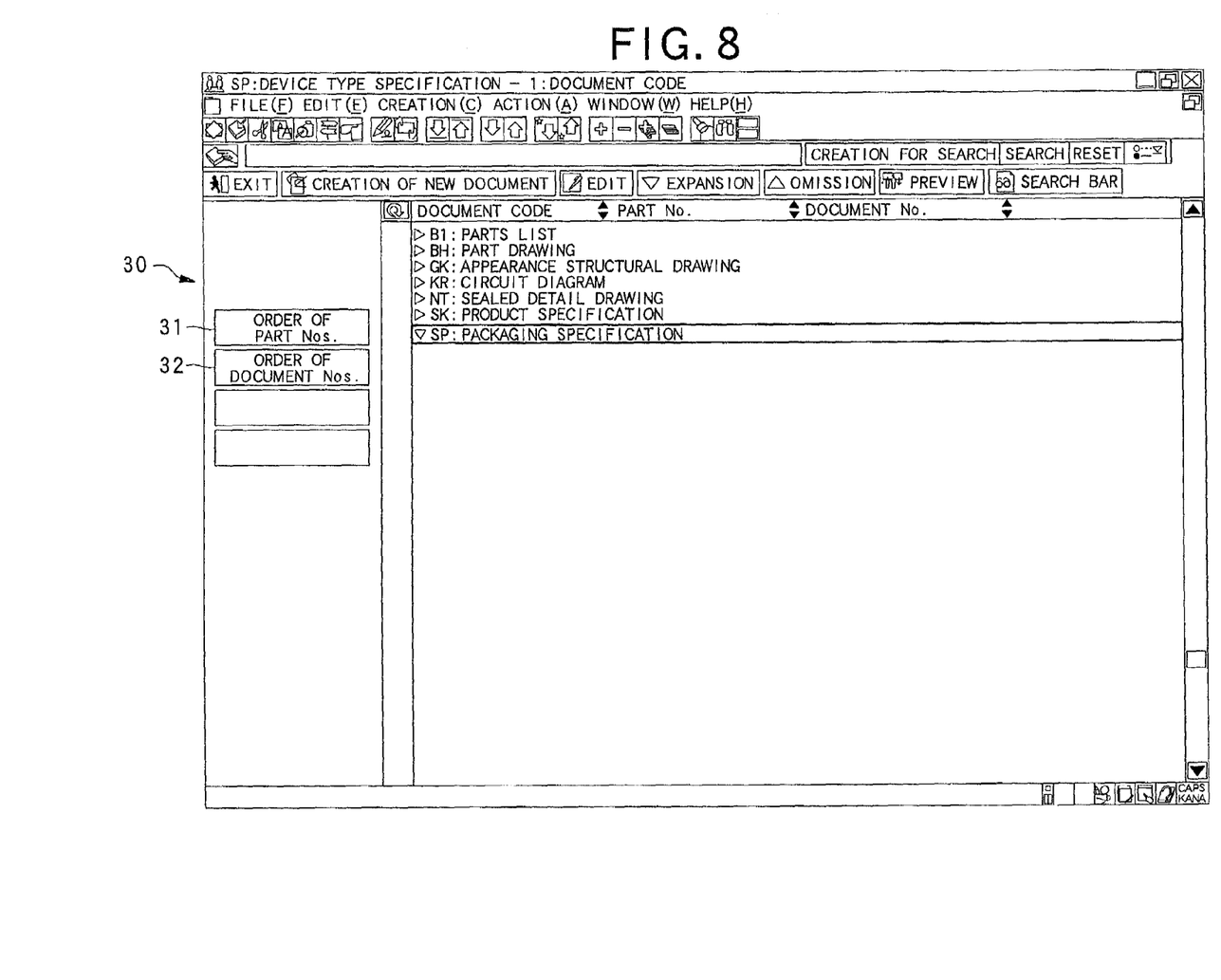
FIG. 8 illustrates an example of a screen image on which pieces of design information are displayed in sequence based on document codes using the search keys in the present embodiment.

On a screen 30 of each of the personal computers 9a, 9b, . . . , 9n are displayed search keys correspondingly to each of a device type specification, a part specification, and a distribution list of specifications (every destination to be distributed). As shown in FIGS. 7 and 8, each of the device type specification and the part specification includes two types of search keys; a search key 31 showing an "order of part Nos." and a search key 32 showing an "order of document codes." When the search key 31 showing an "order of part Nos." is selectively specified, a screen shown in FIG. 7 is displayed. When the search key 32 showing an "order of document codes" is selectively specified, a screen shown in FIG. 8 is displayed. This display is established on, for example, "Windows (registered trademark)," which is an operating system produced by Microsoft Corporation. Thus a desired part number or document number is inputted on the screen for a prefix search, with the result that the display for the desired part or document can be achieved.

Figure 9:
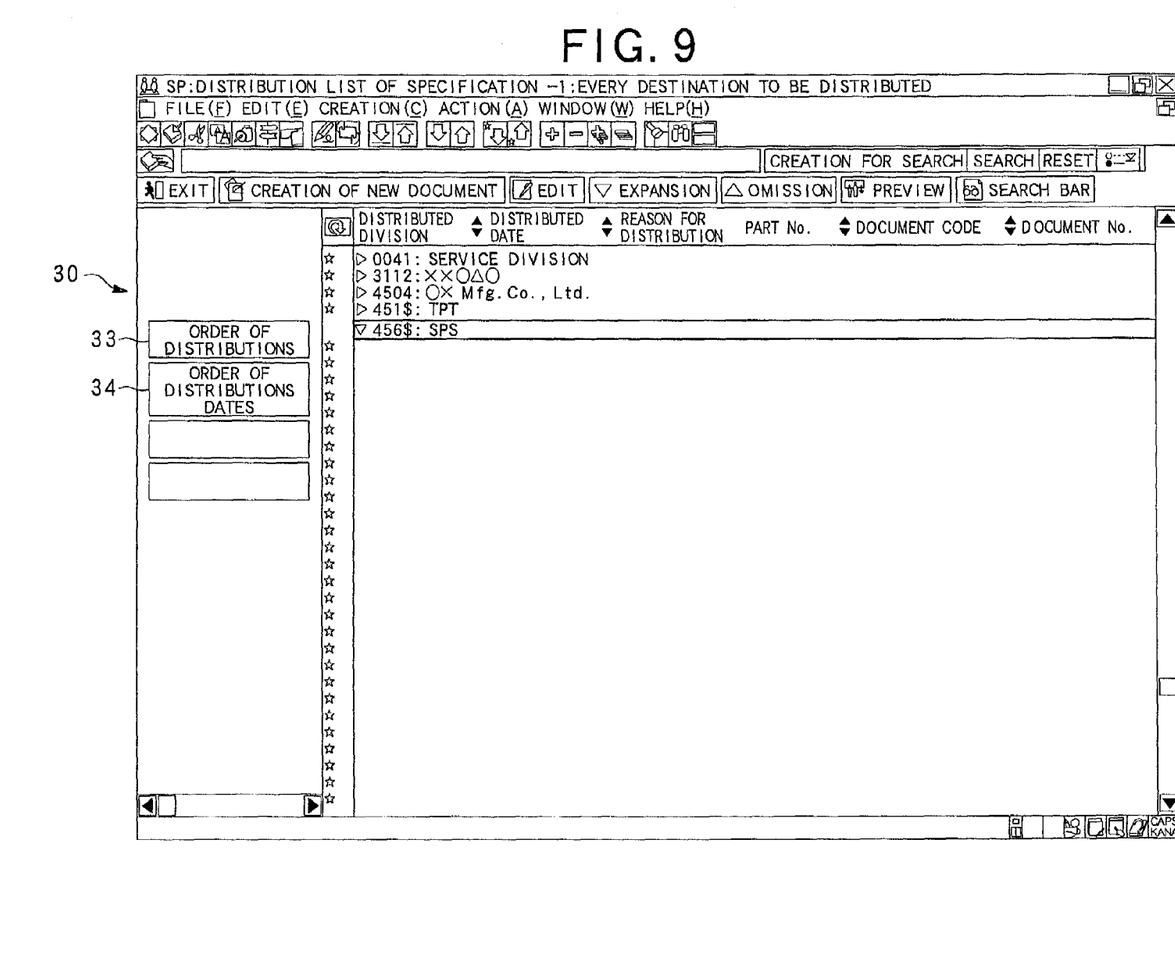
FIG. 9 illustrates an example of a screen image on which pieces of design information are displayed in sequence based on an order of distributed destinations using the search keys in the present embodiment.
Figure 10:
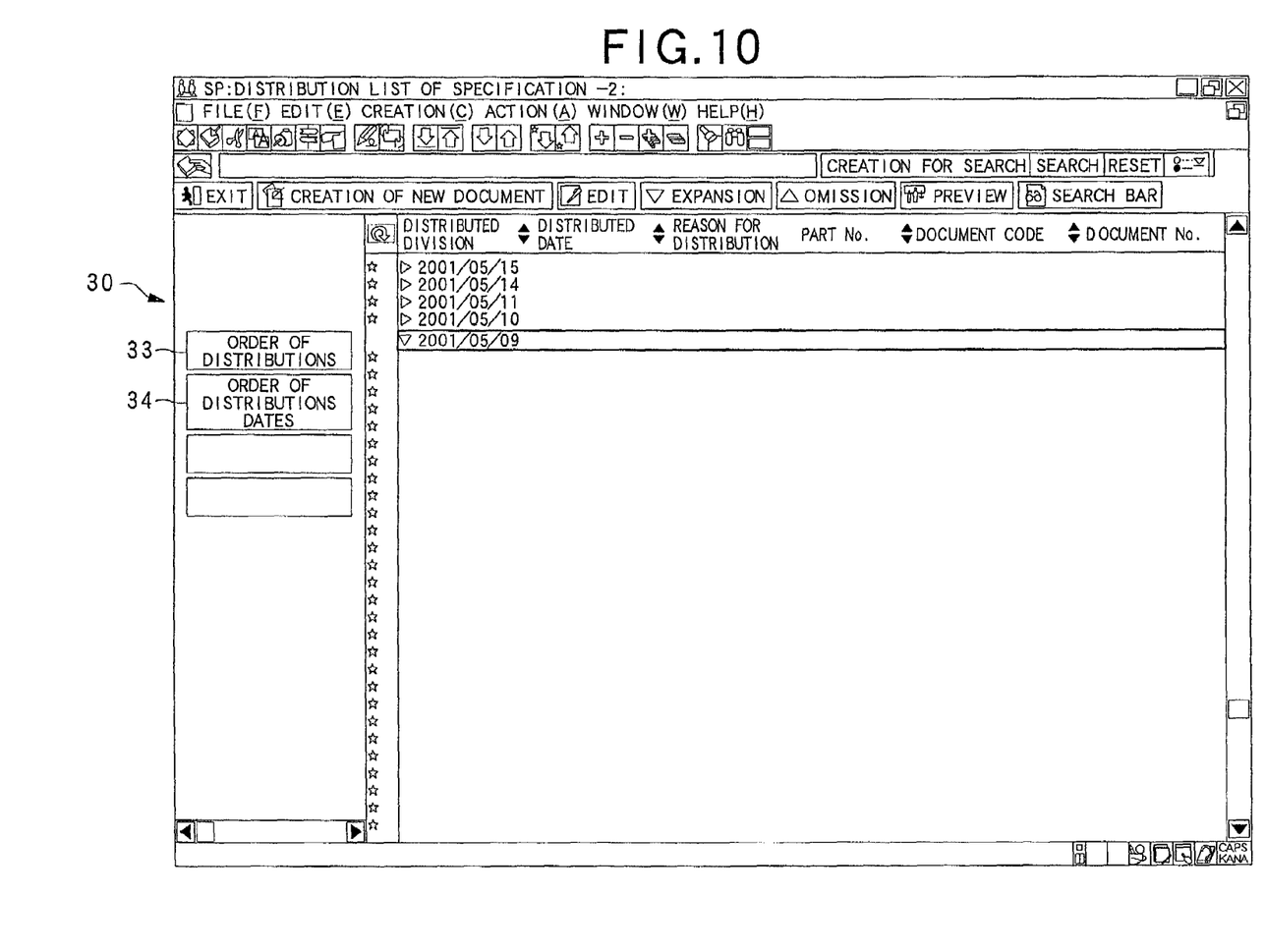
FIG. 10 illustrates an example of a screen image on which pieces of design information are displayed in sequence based on distribution dates using the search keys in the present embodiment.

Further, in the case of the distribution list of specifications, there are provided two types search keys 33 and 34, as shown in FIGS. 9 and 10. One search key 33 is assigned to an order of distributions and the other search key 34 is assigned to an order of distribution dates. Selective specification of the search key 33 showing an "order of destinations" allows a screen shown in FIG. 9 to be displayed. Alternatively, selectively specifying the search key 34 showing an "order of distribution dates" allows a screen shown in FIG. 10 to be displayed. This display is also established on, for example, Windows®. Thus a desired part number or document number is inputted on the screen for a prefix search, with the result that the display for the desired part or document can be achieved.

The foregoing design information disclosure system or design information disclosure method can be realized based on programs installed in the computer-readable memories 26 to 28 (recording mediums) incorporated in the system.

As described above, the present embodiment makes it possible to disclose design information in an automatic fashion. Hence work man-hours and management man-hours necessary for management of documents can be lowered markedly, while the design information can be disclosed in a steady and quick manner.

The format converter 17, which is able to convert various-format data into data on the same format, is arranged, so that the same type of interface 7 arranged to view design information on the users' side can be used. Accordingly, it is possible to use the design information in common, which leads to various advantages, such as an earlier start of work at the next process, an earlier finding of contents of problems, and elimination of repeated redundant work.

In the present embodiment, terminal-use design information in accordance with design information received with reference to the mail addresses in the mail information file 20 is transmitted to a certain personal computer in the terminal system, the personal computer having a certain mail address to which mail delivery should be done. Thus, a user who handles the personal computer is able to acquire design information with steadiness.

Further, in the present embodiment, the search information in the search key file 21 is displayed by each personal computer in the terminal system 10, and in response to specification of a desired piece of search information on a certain personal computer, pieces of terminal-use design information that correspond to the specification are read out from the TIFF file 18 and displayed. This enables design information desired by a user to be provided securely.

Moreover, when storing pieces of design information into the TIFF file 18 is approved, document data and drawing data, which compose the design information, are inputted into the design information managing system 3. This assures the establishment of stable disclosure timing, in addition to a secure disclosure of the design information. Due to the fact that it is almost impossible to wrongly alter the data stored in the TIFF file 18, management for security can be made easier.

Because all design information is temporarily stored in the design information storing file 14 serving as a buffer, design information to be displayed on a personal computer in the terminal system 10 can securely be stored in the TIFF file 18. Additionally, the database 22 is controlled by the standard function of Notes®, so that management for security and synchronization with a remote database can be done with the newest functions of Notes®.

Further, the format converter 17 is adopted to format-convert handwritten drawings and handwritten specifications 13, both of which are read by the image scanner 19, into data of a format displayable on the personal computers in the terminal system 10. This is effective for increasing amounts of pieces of information to supply.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

By way of example, the TIFF file 18 employed in the foregoing embodiment as the terminal-use design information storing unit can be substituted for a PDF (Portable Digital Format) file.

Further, the database 22 in the design information providing system 5 in the foregoing embodiment can be operated on other types of software, other than Notes®, such as Windows NT (registered trademark), which is an operating system made by Microsoft Corporation in US, or NetWare (registered trademark), which is a network operating system made by Novell Inc. in US.

The entire disclosure of Japanese Patent Application No. 2001-167260 filed on Jun. 1, 2001 including the specification, claims, drawings and summary is incorporated herein by reference in its entirety.

What is claimed is:

1. A design information disclosure system comprising:
   a design information storing unit configured to store design information produced on the basis of a given format, the design information to be disclosed consisting of document data and drawing data;
   an extraction unit configured to extract, at a predetermined timing, from the design information storing unit, both the document data and the drawing data which are associated with each other, the predetermined timing corresponding to a timing when the design information is approved for storage in the design information storing unit; and
   a design information disclosing unit, built on a communication network communicably connected to a terminal with an electronic mail function so that the terminal is allowed to access the design information disclosing unit via the communication network, the design information disclosing unit including
      a format converting unit for receiving the design information consisting of the document data and the drawing data extracted by the extraction unit and converting the received design information into design information having a format which is displayable on the terminal, and
      a terminal-use design information storing unit for storing the format-converted design information to be displayed on the terminal as terminal-use design information, the terminal-use design information being allowed to be obtained by the terminal using the electronic mail function.

2. The design information disclosure system according to claim 1, wherein the design information disclosing unit includes a design information storing file to store the design information that has been received, the design information stored in the design information storing file being read and format-converted by the format converting unit.

3. The design information disclosure system according to claim 1, wherein the format converting unit is configured to convert hand-written design information read by an information reading unit to the format displayable on the terminal.

4. A computer-readable recording medium having stored thereon a program for realizing the functions performed in the design information disclosure system according to claim 1.

5. A design information disclosure system comprising:
   a design information storing unit configured to store design information produced on the basis of a given format, the design information to be disclosed consisting of document data and drawing data which are associated with each other;
   an extraction unit configured to extract, at a predetermined timing, from the design information storing unit, both the document data and the drawing data, the predetermined timing corresponding to a timing when the design information is approved for storage in the design information storing unit;
   a design information disclosing unit, built on a communication network communicably connected to a terminal with an electronic mail function so that the terminal is allowed to access the design information disclosing unit via the communication network, the design information disclosing unit including
      a format converting unit for receiving the design information consisting of the document data and the drawing data extracted by the extraction unit and converting the received design information into design information having a format which is displayable on the terminal,
      a terminal-use design information storing unit for storing the format-converted design information as terminal-use design information allowed to be displayed on the terminal, and
      a mail address storing unit for storing a mail address of the terminal in order to transmit to the terminal either the design information or the terminal-use design information; and
   a unit configured to transmit a specified piece of terminal-use design information corresponding to a specified piece of design information received with reference to the mail address stored in the mail address storing unit, to a specified terminal having a specified mail address to which a mail is distributed, in cases where the format converting unit receives the design information.

6. The design information disclosure system according to claim 5, wherein the design information disclosing unit includes a design information storing file to store the design information that has been received, the design information stored in the design information storing file being read and format-converted by the format converting unit.

7. The design information disclosure system according to claim 5, wherein the format converting unit is configured to convert hand-written design information read by information reading unit to the format displayable on the terminal.

8. A design information disclosure system comprising:
a design information storing unit configured to store design information produced on the basis of a given format, the design information to be disclosed consisting of document data and drawing data which are associated with each other;
an extraction unit configured to extract, at a predetermined timing, from the design information storing unit, both the document data and the drawing data, the predetermined timing corresponding to a timing when the design information is approved for storage in the design information storing unit; and
a design information disclosing unit, built on a communication network communicably connected to a terminal with an electronic mail function so that the terminal is allowed to access the design information disclosing unit via the communication network, the design information disclosing unit including
a search information storing unit for storing search information to search the design information stored in the design information storing unit,
a format converting unit for receiving the design information consisting of the document data and the drawing data extracted by the extraction unit and converting the received design information into design information having a format which is displayable on the terminal, and
a terminal-use design information storing unit for storing the format-converted design information as terminal-use design information allowed to be displayed on the terminal; and
a unit configured to read and display, in cases where the search information is displayed on the terminal and a piece of design information is specified on the terminal based on the display of the search information, a specified piece of terminal-use design information corresponding to the specified search information.

9. The design information disclosure system according to claim 8, wherein the design information disclosing unit includes a design information storing file to store the design information that has been received, the design information stored in the design information storing file being read and format-converted by the format converting unit.

10. The design information disclosure system according to claim 8, wherein the format converting unit is configured to convert hand-written design information read by information reading unit to the format displayable on the terminal.

11. A method of disclosing design information on a communication network, comprising:
storing design information produced in a predetermined format, the design information to be disclosed consisting of document data and drawing data which are associated with each other;
extracting, at a predetermined timing, from the stored design information, both the document data and the drawing data, the predetermined timing corresponding to a timing when the design information is approved for storage in the design information storing unit;
receiving the extracted design information;
converting the design information into design information having a format which is displayable by a terminal having an electronic mail function, the terminal being communicably connected to the network; and
storing, on the communication network, the format-converted design information as terminal-use design information which is allowed to be read using an electronic mail based on the electronic mail function so that the terminal-use design information is displayed on the terminal.

12. A computer-readable recording medium having stored thereon a program for realizing the functions performed by the design information disclosure method according to claim 11.

13. A design information disclosure system comprising:
a design information storing unit configured to store design information produced on the basis of a given format, the design information to be disclosed including document data and associated drawing data stored in separate databases;
an extraction unit configured to extract both the document data and the drawing data from the design information storing unit at a predetermined timing when the design information is approved for storage in the design information storing unit; and
a design information disclosing unit, built on a communication network communicably connected to a terminal with an electronic mail function so that the terminal is allowed to access the design information disclosing unit via the communication network, the design information disclosing unit including
a format converting unit for receiving the extracted document and drawing data and converting the received document and drawing data into design information having a format which is displayable on the terminal,
a terminal-use design information storing unit for storing the format-converted design information to be displayed on the terminal as terminal-use design information, and
a controller for executing an e-mail function to forward the terminal-use design information by electronic mail to a specified electronic mail address,
wherein
the terminal is configured to display the terminal-use design information forwarded by electronic mail.

* * * * *